United States Patent
Kahler

(10) Patent No.: US 8,593,091 B2
(45) Date of Patent: Nov. 26, 2013

(54) DQ VECTOR CONTROL SYSTEM PROVIDING STABLE, HIGH EFFICIENCY OPERATION OF ELECTRIC MOTOR

(75) Inventor: Paul H. Kahler, Shelby Township, MI (US)

(73) Assignee: Magna E-Car Systems of America, Inc., Auburn Hills, MI (US)

( * ) Notice: Subject to any disclaimer, the term of this patent is extended or adjusted under 35 U.S.C. 154(b) by 371 days.

(21) Appl. No.: 13/116,740

(22) Filed: May 26, 2011

(65) Prior Publication Data

US 2011/0316457 A1 Dec. 29, 2011

Related U.S. Application Data

(60) Provisional application No. 61/358,628, filed on Jun. 25, 2010.

(51) Int. Cl.
*H02P 21/00* (2006.01)
(52) U.S. Cl.
USPC .................................. 318/400.07; 318/400.02

(58) Field of Classification Search
USPC ............... 318/615, 628, 700, 400.02, 400.04, 318/400.07, 809
See application file for complete search history.

(56) References Cited

U.S. PATENT DOCUMENTS

| | | | | |
|---|---|---|---|---|
| 6,396,229 | B1 * | 5/2002 | Sakamoto et al. | 318/400.02 |
| 6,492,788 | B1 * | 12/2002 | Agirman et al. | 318/700 |
| 6,979,967 | B2 * | 12/2005 | Ho | 318/400.02 |
| 7,066,034 | B2 * | 6/2006 | Ying Yin Ho | 73/862.193 |

* cited by examiner

*Primary Examiner* — Bentsu Ro
(74) *Attorney, Agent, or Firm* — Gardner, Linn, Burkhart & Flory, LLP

(57) ABSTRACT

A control system for a multiphase electric motor includes inputs for a desired torque output of the motor, a measured torque output of the motor, a signal representative of optimal motor efficiency; a signal representative of a measured efficiency of the motor. The output is a two-dimensional DQ control voltage. A torque feedback control loop minimizes error between the desired and measured torque outputs by controlling an angle of the DQ control voltage, and a motor efficiency feedback control loop minimizes error between the optimal and measured motor efficiencies by controlling a magnitude of the DQ control voltage.

13 Claims, 5 Drawing Sheets

DQ VECTOR CONTROL SYSTEM PROVIDING STABLE, HIGH EFFICIENCY OPERATION OF ELECTRIC MOTOR

FIELD OF INVENTION

The invention generally relates to the field of electric motors, and more particularly to high performance vector based motor controllers.

BACKGROUND OF INVENTION

There are challenges in operating a three phase electric motor above base speed in a conventional Vector Control motor control system. These controllers operate in a 2-dimensional space called the DQ-plane where both the motor current and applied motor voltage are represented by two dimensional vectors. The two dimensional vectors are derived by transforming sinusoidal three phase current signals into the DQ plane via the Clark and Park transforms as known in the art per se. The DQ vectors are non-sinusoidal d.c. signals for a given motor speed, thus simplifying the control problem and minimizing the computational load requirements of the controller.

The conventional DQ controller utilizes two feedback control loops to determine DQ control voltages based on DQ currents. The DQ currents and voltages, however, have limits based on physical constraints.

More particularly, consider the ellipse 20 in FIG. 1A, which represents the permissible DQ motor currents for a base motor speed. The DQ current at any point in time will be somewhere within the ellipse 20. Likewise, the circle 30 in FIG. 1B represents the permissible DQ voltage, which is based on source voltage constraints and inverter capability. The DQ control voltage at any point in time will be somewhere within or at the edge of the circle 30.

Referring back to FIG. 1A, the permissible DQ currents, i.e., the size of the ellipse, will vary with motor speed and the applied DQ voltage. As the motor speed increases, the back electromotive force (emf) increases limiting the amount of current that can flow in the motor. Consequently, as the speed of the motor increases, the range of permissible DQ currents shrinks as exemplified by the size of the smaller ellipse 20' shown in stippled lines.

Note that the limitation on applied voltage is not a function of motor operation and is determined only by the available source voltage. The radius of circle 30 in FIG. 1B thus remains essentially constant for a given source voltage.

It is generally desired to operate the electric motor under conditions of maximum power efficiency where $I^2R$ losses are minimized and the motor provides the most torque per ampere of current (MTPA). The MTPA curve, shown at ref. no. 24 in FIG. 1A, is typically derived empirically at a relatively low "base" motor speed so that large currents can be applied to the motor in order to flush out the nature of the curve 24.

Thus, for a given torque output, which is represented by one of curves 28 in FIG. 1A, the ideal DQ current to operate the motor is found on the MTPA curve 24. For example, if torque curve 28a represents 100 Nm output, the ideal DQ current is found at point 27, and the feedback control loop adjusts the DQ control voltages to achieve the DQ current represented by point 27. These operating conditions are relatively easy to achieve when the motor speed is low, however, as the motor speed increases the ideal voltage and current vectors are no longer physically possible. For example, at higher motor speeds where the achievable range of DQ currents is exemplified by the smaller ellipse 20', the ideal MTPA point 27 for the 100 Nm output lies outside ellipse 20'. The DQ controller must thus use a less efficient operating point along the torque curve 28a, for example, at point 29.

Note that point 29 will not lie at the edge of the permissible range of DQ currents represented by ellipse 20' because another problem exists at high speed when the applied DQ voltage reaches the limit circle 30. More particularly, the typical DQ vector controller may become unstable when the output voltage reaches this limit. Since points on the voltage circle 30 correspond with points on the current ellipse 20', this leads to systems where the current must be kept inside the operating region without going all the way to the edge, else the control system may become unstable. By not allowing the DQ current and voltage to reach the physical limits, the system becomes less efficient. As a result, the system designer must trade efficiency for stability.

The stability problem arises from the manner in which the typical DQ current controller is constructed, where one feedback control loop regulates $V_d$ based on changes in $I_d$ and another feedback control block regulates $V_q$ based on changes in $I_4$. The conventional construction assumes that, in order to cause an increase in $I_d$, the system must first increase $V_d$, and that a similar relationship exists between $I_q$ and $V_q$. The problem arises when the voltage limit circle is reached, and a change in $V_d$ for example may force a change in $V_d$ due to the limit circle, at which point the conventional DQ current controller essentially loses one degree of freedom. The instability is partially caused by the tension between the two feedback control loops when constrained by the circular voltage limit. The problem is exacerbated when the motor is run in the generator mode.

SUMMARY OF INVENTION

According to one aspect of the invention a control system for a multiphase electric motor is provided. The system includes: an input for a desired torque output of the motor; an input for a measured torque output of the motor; an input representative of optimal motor efficiency; an input representative of a measured efficiency of the motor; and an output for a two-dimensional DQ control voltage. A torque feedback control loop minimizes error between the desired and measured torque outputs by controlling an angle of the DQ control voltage, and a motor efficiency feedback control loop minimizes error between the optimal and measured motor efficiencies by controlling a magnitude of the DQ control voltage. Means are also provided for applying the DQ control voltage to the motor.

In the foregoing system, when the magnitude of the DQ control voltage reaches a maximum value in the motor efficiency control loop, the torque control loop preferably varies the angle of the DQ control voltage.

Also, motor efficiency is preferably represented by a maximum torque per amp (MTPA) curve in a DQ current plane, and the error in motor efficiency is determined by a distance the measured D current is from a desired D current on the MTPA curve.

According to another aspect of the invention, a control system for a multiphase electric motor is provided which includes inputs for a desired and a measured torque output of the motor, signals representative of optimal and measured motor efficiency; desired and measured D-axis and Q-axis currents, and motor speed; and an output for a two-dimensional DQ control voltage. A first controller having a torque feedback loop and an efficiency feedback loop generates a first intermediary DQ control voltage, the torque feedback control loop minimizing error between the desired and measured torque outputs by controlling an angle of the DQ control voltage and the motor efficiency feedback control loop minimizing error between the optimal and measured motor efficiencies by controlling the magnitude of the DQ control voltage. A second controller having a D-axis control loop and a Q-axis control loop generates a second intermediary DQ control voltage, the D-axis control loop minimizing error between the desired and measured D-axis currents by controlling the D-axis control voltage and the Q-axis control loop minimizing error between the desired and measured Q-axis currents by controlling the Q-axis control voltage. A mixing circuit determines the output DQ control voltage by blending the first and second intermediary control voltages as a function of motor speed. And means are provided for applying the DQ control voltage to the motor.

In the foregoing control system the mixing circuit preferably gives zero weight to the first intermediary DQ control voltage when the motor speed is less than a first predetermined motor speed and gives zero weight to the second intermediary DQ control voltage when the motor speed is greater than a second predetermined motor speed.

In the foregoing control system, when the magnitude of the first intermediary DQ control voltage reaches a maximum value in the efficiency control loops, the torque control loop preferably varies the angle of the DQ control voltage.

The motor efficiency is preferably represented by a maximum torque per amp (MTPA) curve in a DQ current plane, and the error in motor efficiency is determined by a distance the measured D current is from an optimal D current ori the MTPA curve.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1A:
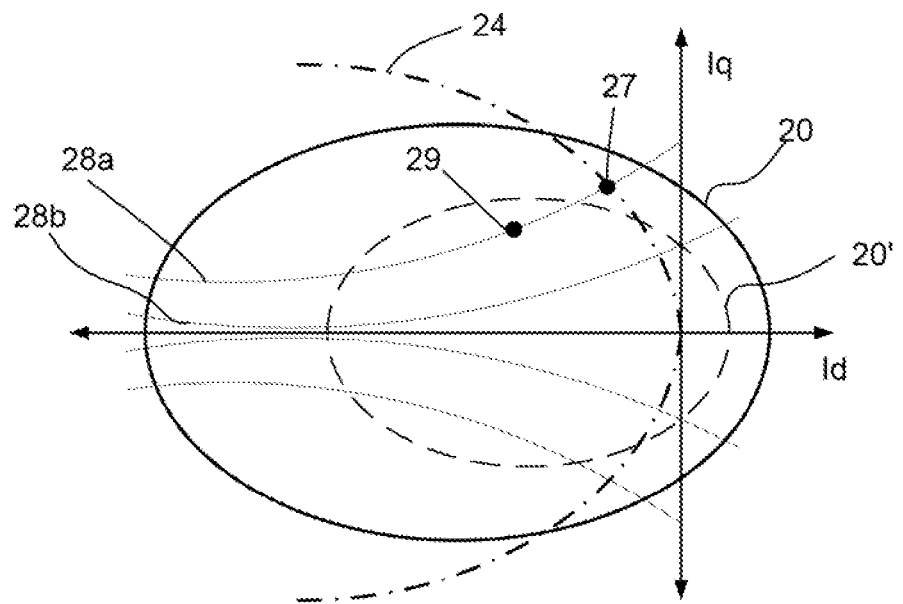
FIG. 1A is a graph illustrating the most efficient operating currents for a achieving various torque levels within a permissible range of DQ currents for a given DQ control voltage and motor speed.
Figure 1B:
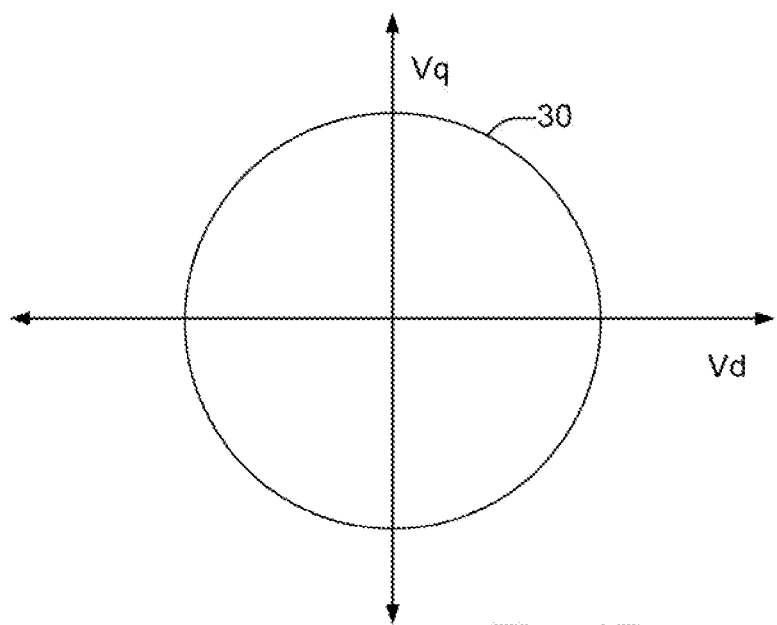
FIG. 1B is a graph illustrating a permissible range of DQ control voltages.
Figure 2:
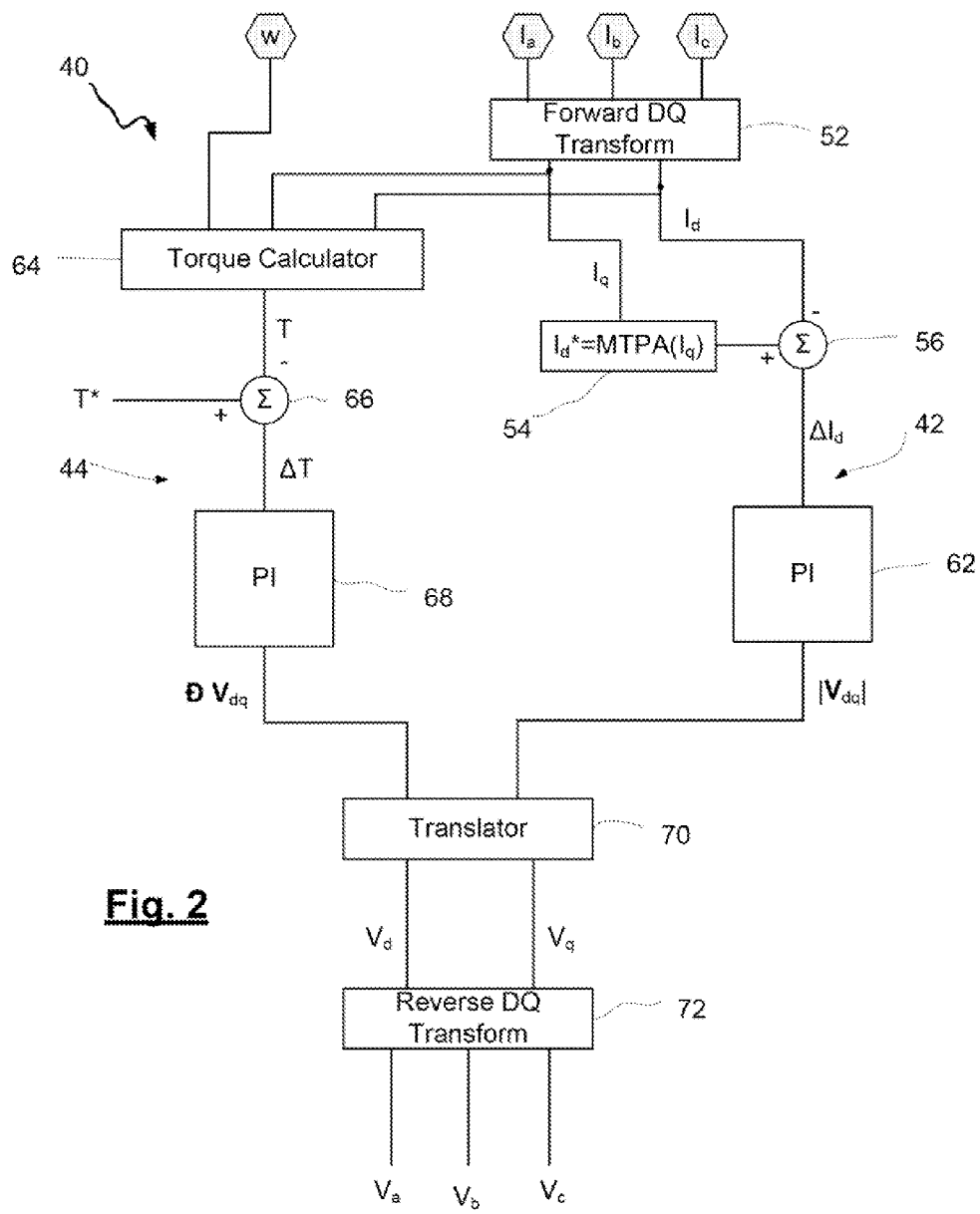
FIG. 2 is a block diagram of a DQ magnitude and angle based control system according to a first embodiment.

FIG. 2 shows a control system 40 that sets the D and Q axis currents by controlling the magnitude and angle of a vector representing the D and Q voltages (as opposed to the conventional prior art current controller where the D current is set by controlling the D voltage and the Q current is set by controlling the Q voltage.)

Figure 3:
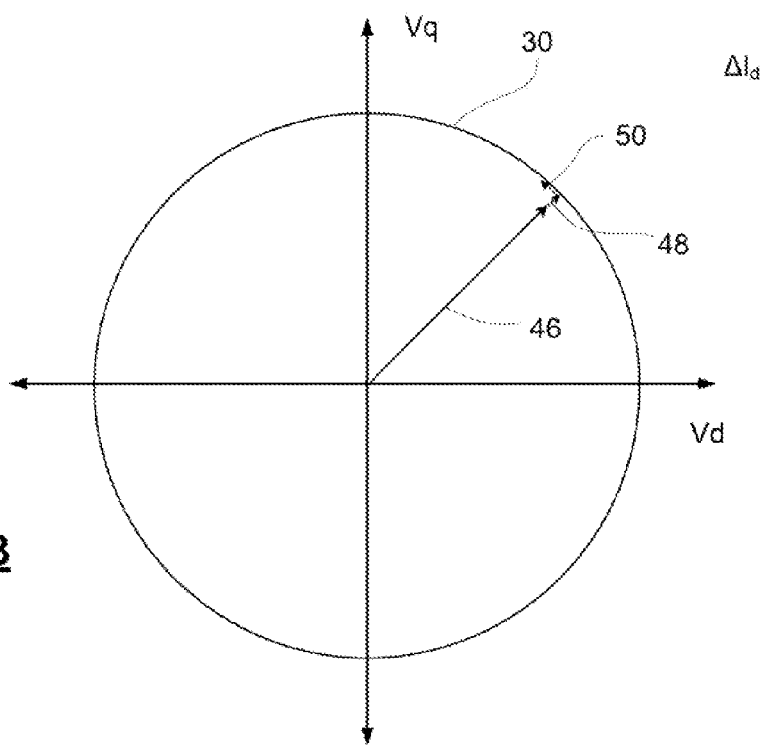
FIG. 3 is a graph of the DQ control voltage plane illustrating various signals utilized by the first embodiment.

Generally speaking, the control system 40 comprises two feedback control loops 42, 44 that respectively regulate two parameters, efficiency and torque, as discussed in greater detail below. Efficiency is regulated by varying the magnitude (length) of the DQ voltage vector, and torque is regulated by varying the angle of the DQ voltage vector. FIG. 3 graphically illustrates this concept, showing DQ voltage vector 46, which represents the measured operating point. Control loop 42 generates a change vector 48 that will affect the magnitude of the DQ vector 46. Control loop 44 generates a second change vector 50 orthogonal to change vector 48, which in effect results in a change in the angle of the DQ vector 46. Thus, when the system reaches the voltage limit circle 30, the magnitude control loop 42 becomes saturated and is no longer effective, while the angular control loop 44 remains free to reach its objective without interference from the other control loop.

More particularly, the control system 40 receives as input the measurements of the electric motor phase currents $I_a$, $I_b$, $I_c$. Block 52 transforms the real electric motor phase currents $I_a$, $I_b$, $I_c$ into the DQ currents $I_d$, $I_q$ as known in the art per se.

Figure 4:
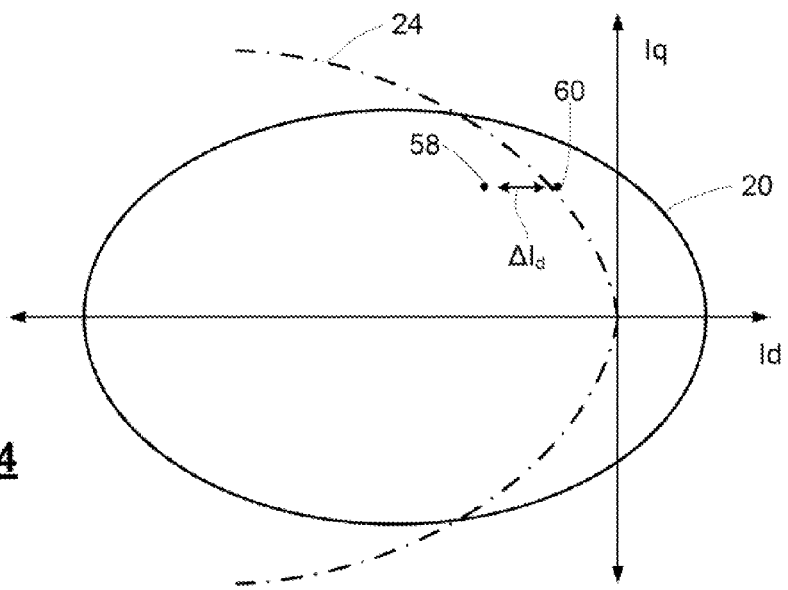
FIG. 4 is a is a graph of the DQ current plane illustrating how the first embodiment determines error in motor operating efficiency.

The magnitude control loop 42 includes a motor efficiency block 54, which determines an ideal point on the MTPA curve 24 so that an error can be computed between the measured I(d,q) operating point and the ideal point. In practice, an ideal D current point $I^*_d$ is determined as a function of the measured $I_q$ point. An error signal $\Delta I_d$ is computed at summer 56 by subtracting the measured current $I_d$ from the ideal current $I^*_d$. This is schematically illustrated in FIG. 4, where point 58 represents the measured operating current I(d,q) in the DQ plane and point 60 represents the ideal operating point on the MTPA curve 24. The error $\Delta I_d$ between these two points is schematically indicated by the arrow between points 58 and 60.

The error signal $\Delta I_d$ is fed as an input to a PI controller 62. The output of controller 62 provides a signal $|V_{dq}|$ for the magnitude of the control DQ voltage vector.

The angle control loop 44 includes a torque calculator 64 which calculates the torque T presently provided by the motor based on the measured DQ currents $I_d$, $I_q$ and the motor speed w, as known in the art per se. Alternatively, a torque sensor may be employed to measure torque directly. A desired torque T* is provided to the control loop 44 by another entity, e.g., from a functional block (not shown) which converts throttle position to a torque request. The error in the torque, $\Delta T$, is computed at summer 66 and fed to a second PI controller 68 which provides a signal $\angle V_{dq}$ for the angle of the control DQ voltage vector.

Functional block 70 translates the DQ voltage vector information $|V_{dq}|$, $\angle V_{dq}$ into Cartesian signals $V_d$, $V_q$. These, in turn are fed to a block 72 that transforms the DQ information into three real phase voltages $V_a$, $V_b$, $V_c$ that are applied to a pulse width modulation circuit (not shown) for controlling the motor power inverter.

From the foregoing it will be seen that, for a given voltage magnitude, variations in the angle of the DQ voltage vector torque will control the motor torque, and variations in the magnitude of the DQ voltage vector will control motor efficiency, as discussed above. Due to this structure the system 40 can thus control torque under all conditions, and has the ability to regulate efficiency until the voltage limit is reached. At that limit, it is no longer possible to control the motor at optimal efficiency but the torque regulation will remain unaffected.

A more preferred control system 80 utilizes a conventional DQ current controller for low speed operation and a torque (based on vector magnitude and angle) controller for high speed operation. At intermediate speeds, the control system 80 blends the outputs of both controllers.

In the conventional DQ current controller used for low speed operation, where $I_d$ is set by controlling $V_d$ and $I_q$ is set by separately controlling $V_q$, the DQ current is commanded to follow a path of maximum efficiency dictated by the MTPA curve 24 as exemplified in FIG. 4. D and Q axis current commands are moved along the MTPA curve 24 to produce varying torque from the motor. In general, zero torque is produced for currents that lie on the D axis, positive Q currents produce increasingly positive torque and negative Q currents produce increasingly negative torque (in the opposite direction) where the motor is utilized as a generator. The periphery of the ellipse 20 represents the physical limits on current that are imposed by increasing motor speed or decreasing voltage. At normal system voltage and low speed this ellipse, representing the permissible range of currents, is very large and does not impact the ability to move about on the MTPA curve 24. FIG. 4 as particularly illustrated represents a moderately high speed where it becomes impossible to operate at the extremes of the MTPA curve. At extreme speeds it is possible for the ellipse to shrink to the point where it is completely to the left of the MTPA curve. (In this case it is necessary to have a small negative D-axis current to operate even with no torque.)

For high speed operation, the control system 80 will vary the DQ voltage angle to control torque. This causes the DQ current to follow the outline of the ellipse 20 in the DQ current plane. By increasing the voltage magnitude, the size of the ellipse is artificially reduced, so the system can achieve a given torque while following the MTPA curve 24 for maximum efficiency. This works until the voltage magnitude reaches its limit at which point the control system 80 will be unable to follow the MTPA curve 24 and will have to operate along the perimeter of ellipse 20 to reach its torque objective. This is exactly the desired behavior—operate efficiently until it is not possible to do so due to voltage limitations.

Figure 5:
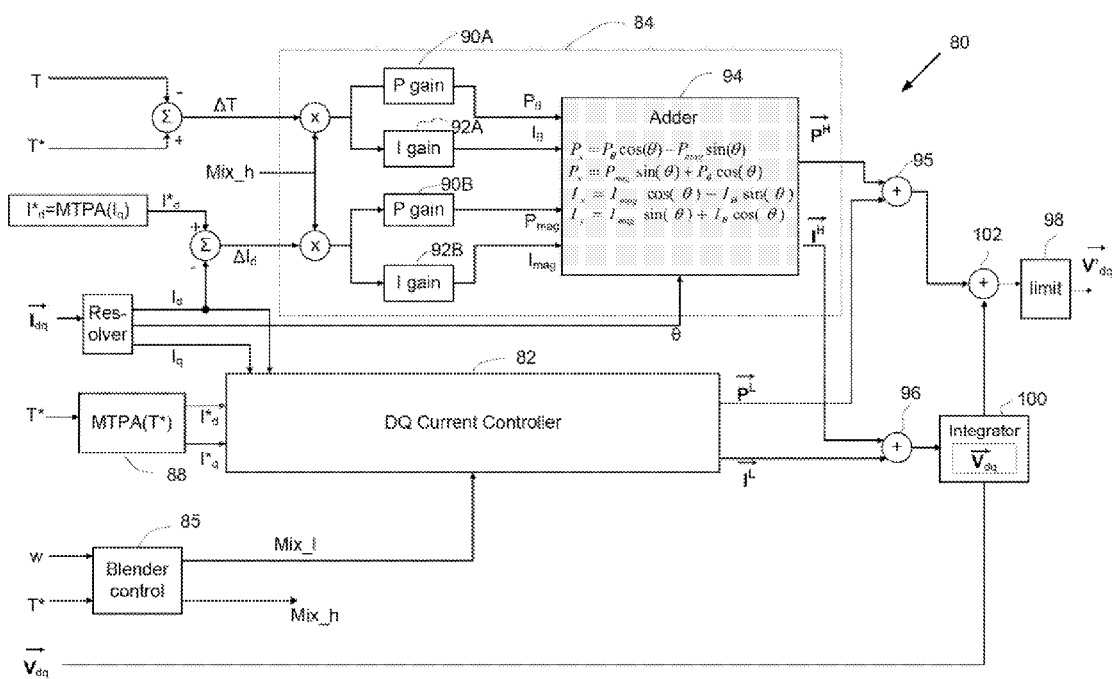
FIG. 5 is a block diagram of a dual motor control system according to a second embodiment which utilizes a torque controller for high speed motor operation and a conventional DQ current controller for low speed operation.
Figure 6:
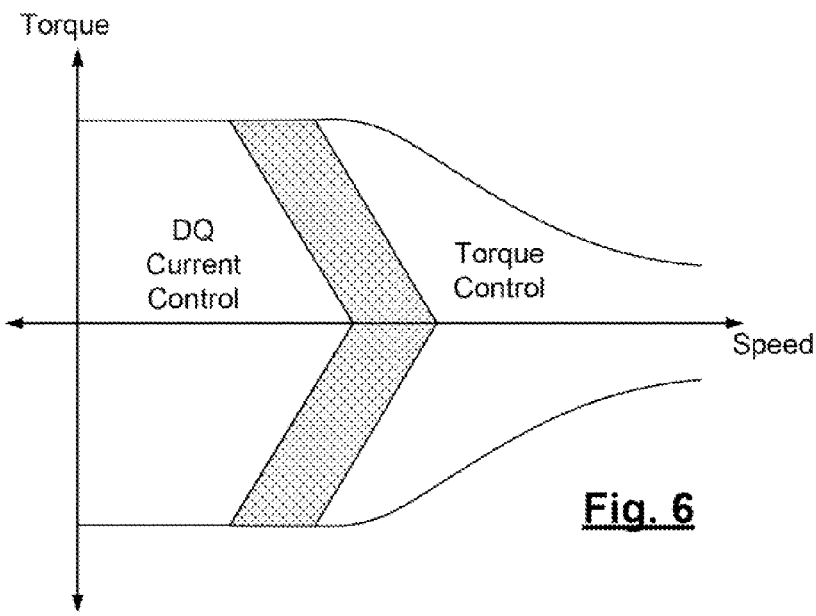
FIG. 6 is a diagram illustrating the transition between the torque and current control modes of operation in the second embodiment as a function of torque and motor speed.

FIG. 5 shows an implementation of control system 80, which includes a conventional DQ current controller 82 for low speed operation and a torque controller 84 (regulating DQ voltage vector magnitude and angle) for high speed operation. A mixing block 85 provides two output signals Mix_l and Mix_h that specify the contribution of each controller 82, 84 to the DQ control voltage based on motor speed and torque, as exemplified in FIG. 6. Thus, Mix_h will be 0 when the system 80 operates in the low speed mode, 1 when the system 80 operates in the high speed mode, and a proportional value in between 0 and 1 depending on the relative distance of the torque, speed operating point to the low speed and high speed operating modes as exemplified in FIG. 6. Likewise, the Mix_l signal will be inverse to the Mix_h signal. As discussed in greater detail below, the proportional term outputs of the two controllers 82, 84, vectors $P^L$ and $P^H$, are summed, and the integral term outputs of the two controllers 82, 84, vectors $I^L$ and $I^H$, are summed and integrated.

Figure 7:
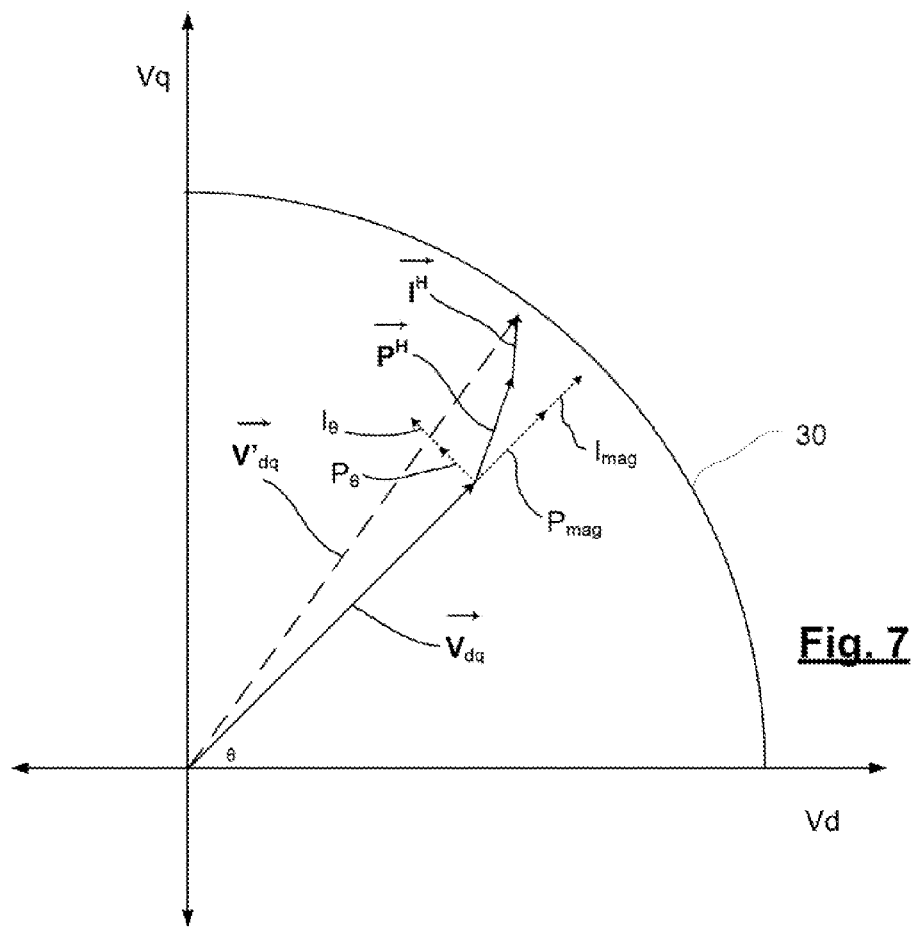
FIG. 7 is a graph of the DQ control voltage plane illustrating various signals utilized by the second embodiment.

The operation of the torque controller 84 can be better understood with additional reference to FIG. 7, which graphically illustrates the vector manipulations. Vector $V_{dq}$ represents the present DQ voltage, and vector $V'_{dq}$ represents the updated DQ control voltage. $P_{mag}$ and $I_{mag}$ represent the proportional and integral contributions to the change in magnitude to $V_{dq}$. $P_\theta$ and $I_\theta$ represent the proportional and integral contributions to the change in angle of $V_{dq}$. Vectors $P^H$ and $I^H$ represent the combination of changes to the present DQ voltage $V_{dq}$ as a result of the proportional and integral terms of the PI controller which, when added to $V_{dq}$, result in $V'_{dq}$. (Note that this diagram is grossly exaggerated in that the change vectors are likely to be very small in relation to the DQ voltage.)

In the torque controller 84, the error signal $\Delta I_d$ is fed to a proportional gain block 90B and an integral gain block 92B. These blocks respectively scale $\Delta I_d$ by the magnitude control loop P gain and I gain to provide the two signals $P_{mag}$ and $I_{mag}$, graphically illustrated in FIG. 7. Likewise, the torque error $\Delta T$ (torque calculation block not shown in FIG. 5) is fed to a proportional gain block 90A and an integral gain block 90B. These blocks respectively scale $\Delta I_d$ by the angle control loop P gain and I gain to provide the two signals $P_\theta$ and $I_\theta$, graphically illustrated in FIG. 7. Functional block 94 performs vector addition on $P_{mag}$, $P_\theta$ and $I_{mag}$, $I_\theta$ in the Cartesian plane and outputs the two change vectors $P^H$ and $I^H$.

A limiter block 98 ensures that the magnitude of the DQ control voltage does not exceed physical limits.

The conventional DQ controller 82 receives the desired DQ currents $I^*_d$ and $I^*_q$ from MTPA block 88 which determines the optimal DQ current operating position based on the desired torque T*. The controller 82 also receives as an input the measured DQ currents $I_d$, $I_q$, and based on the error computes $P^L$ and $I^L$. As mentioned previously, the proportional term vector $P^L$ from the low speed controller 82 (which may be zero if Imix_l is zero) is added is added to $P^H$ at summer 95. Likewise, the integral term vector $I^L$ from the low speed controller (which may be zero if Imix_l is zero) is added is added to $I^H$ at summer 96, and the result is fed to a digital integrator 100. (The integrator 100 retains the value of the integration result and thus provides the value of $V_{dq}$ for each computational iteration.) The output of the integrator 100 is added to the sum of the proportional term vectors $P^H+P^L$ at summer 102, the output of which represents the updated control voltage vector $V'_{dq}$.

The integrator block 100 also includes a limiter to ensure that the magnitude of the DQ control voltage does not exceed physical limits.

In the above-described embodiments the torque controller controlled the angle of the DQ control voltage vector to regulate torque, and the efficiency controller controlled the magnitude of the DQ control voltage vector to regulate efficiency. However, in alternative embodiments the torque controller may control the magnitude of the DQ control voltage vector to regulate torque, and the efficiency controller may control the angle of the DQ control voltage vector to regulate efficiency.

The above-described embodiments are intended to be examples of the invention and other alterations and modifications may be effected thereto by those skilled in the art without departing from the scope of the invention.

I claim:
1. A control system for a multiphase electric motor, comprising:
an input for a desired torque output of the motor;
an input for a measured torque output of the motor;
an input representative of optimal motor efficiency;
an input representative of a measured efficiency of the motor;
an output for a two-dimensional DQ control voltage;
a torque feedback control loop which minimizes error between the desired and measured torque outputs by controlling an angle of the DQ control voltage;

a motor efficiency feedback control loop which minimizes error between the optimal and measured motor efficiencies by controlling a magnitude of the DQ control voltage; and means for applying the DQ control voltage to the motor.

2. A control system according to claim 1, wherein, when the magnitude of the DQ control voltage reaches a maximum value in the motor efficiency control loop, the torque control loop varies the angle of the DQ control voltage.

3. A control system according to claim 2, including circuitry for measuring and converting motor phase currents into two-dimensional DQ currents.

4. A control system according to claim 3, wherein the motor efficiency is represented by a maximum torque per amp (MTPA) curve in a DQ current plane, and the error in motor efficiency is determined by a distance the measured D current is from a desired D current on the MTPA curve.

5. A control system according to claim 4, wherein each of the feedback control loops implements a proportional, integral (PI) control loop.

6. A control system according to claim 1, including:
an inverter for coupling a power supply to the motor; and
circuitry including a PWM circuit for controlling the inverter in conformance with the DQ control voltage.

7. A control system for a multiphase electric motor, comprising:
inputs for a desired and a measured torque output of the motor, signals representative of optimal and measured motor efficiency; desired and measured D-axis and Q-axis currents, and motor speed;
an output for a two-dimensional DQ control voltage;
a first controller having a torque feedback loop and an efficiency feedback loop which generate a first intermediary DQ control voltage, the torque feedback control loop minimizing error between the desired and measured torque outputs by controlling an angle of the DQ control voltage and the motor efficiency feedback control loop minimizing error between the optimal and measured motor efficiencies by controlling the magnitude of the DQ control voltage;
a second controller having a D-axis control loop and a Q-axis control loop which generate a second intermediary DQ control voltage, the D-axis control loop minimizing error between the desired and measured D-axis currents by controlling the D-axis control voltage and the Q-axis control loop minimizing error between the desired and measured Q-axis currents by controlling the Q-axis control voltage;
a mixing circuit for determining the output DQ control voltage by blending the first and second intermediary control voltages as a function of motor speed; and
means for applying the DQ control voltage to the motor.

8. A control system according to claim 7, wherein the mixing circuit gives zero weight to the first intermediary DQ control voltage when the motor speed is less than a first predetermined motor speed and gives zero weight to the second intermediary DQ control voltage when the motor speed is greater than a second predetermined motor speed.

9. A control system according to claim 8, wherein, when the magnitude of the first intermediary DQ control voltage reaches a maximum value in the efficiency control loops, the torque control loop varies the angle of the DQ control voltage.

10. A control system according to claim 9, including circuitry for measuring and converting motor phase currents into two-dimensional DQ currents.

11. A control system according to claim 10, wherein the motor efficiency is represented by a maximum torque per amp (MTPA) curve in a DQ current plane, and the error in motor efficiency is determined by a distance the measured D current is from an optimal D current on the MTPA curve.

12. A control system according to claim 7 wherein each of the feedback control loops implements a proportional, integral (PI) control loop.

13. A control system according to claim 7, including:
an inverter for coupling a power supply to the motor; and
circuitry including a PWM circuit for controlling the inverter in conformance with the output DQ control voltage.

* * * * *